United States Patent
Yip et al.

(10) Patent No.: US 6,898,413 B2
(45) Date of Patent: May 24, 2005

(54) METHOD FOR SEAMLESS PORT CAPABILITY FOR AN ALTERNATIVE SERVICE PROVIDER

(75) Inventors: Adrian Yip, Snohomish, WA (US); Alex Vdolek, Redmond, WA (US); Keith Peavler, Edgewood, WA (US)

(73) Assignee: Clearwire Corporation, Kirkland, WA (US)

( * ) Notice: Subject to any disclaimer, the term of this patent is extended or adjusted under 35 U.S.C. 154(b) by 559 days.

(21) Appl. No.: 09/918,566

(22) Filed: Aug. 1, 2001

(65) Prior Publication Data

US 2003/0027521 A1 Feb. 6, 2003

(51) Int. Cl.$^7$ ............................ H04H 1/00; H04M 3/00; H04Q 7/20
(52) U.S. Cl. .................. 455/3.03; 455/419; 455/426.2; 379/93.06; 379/93.07; 379/93.09; 379/399.01; 379/413.02
(58) Field of Search ..................... 455/3.01, 3.03–3.05, 455/419, 426.1, 426.2, 428, 420; 379/90.01, 93.01, 93.05, 93.07, 93.09, 207.12, 399.01, 413.02, 219

(56) References Cited

U.S. PATENT DOCUMENTS

| | | | |
|---|---|---|---|
| 6,028,928 A | 2/2000 | Mullaney et al. ........... 379/399 |
| 6,047,055 A | 4/2000 | Carkner et al. | |
| 6,097,801 A | 8/2000 | Williams et al. | |
| 6,160,880 A | * 12/2000 | Allen ..................... 379/221.13 |
| 6,223,054 B1 | 4/2001 | Katko | |
| 6,243,572 B1 | 6/2001 | Chow et al. | |
| 6,282,277 B1 | * 8/2001 | DeBalko ................ 379/221.02 |
| 6,657,994 B1 | * 12/2003 | Rajakarunanayake ....... 370/352 |
| 6,788,782 B1 | * 9/2004 | Fotsch et al. ............... 379/334 |
| 6,823,064 B1 | * 11/2004 | Korman et al. ............. 379/333 |

* cited by examiner

Primary Examiner—Binh Tieu
(74) Attorney, Agent, or Firm—Davis Wright Tremaine LLP; Michael J. Donohue

(57) ABSTRACT

A method provides seamless porting of a user telephone number from a first telephone service provider network to a second telephone service provider network. A network interface device is provided that is interconnected to the first telephone service provider network, a second telephone service provider network, and at least one user communications device. The network interface device may be remotely controlled using the second telephone service provider network to transfer the user telephone number from the first network to the second network.

19 Claims, 4 Drawing Sheets

METHOD FOR SEAMLESS PORT CAPABILITY FOR AN ALTERNATIVE SERVICE PROVIDER

TECHNICAL FIELD

The present invention relates generally to telecommunication services. It particularly relates to a method for providing remote porting capability for a user telephone number to an alternative communications service provider.

BACKGROUND OF THE INVENTION

Local Number Portability (LNP) has been mandated since the enactment of the 1996 Telecommunications Act to allow a user telephone number to be ported from an incumbent competitive local exchange carrier (ILEC) (e.g., Verizon) providing telephone service to an alternative telephone service provider (e.g., a competitive local exchange carrier—CLEC; e.g., AT&T) enabling seamless voice communications service (e.g., telephone service) for the user. However, the state-by-state practical implementation of LNP has not been uniform nor efficient to provide quality telephone service to users as procedural and technical agreement between at least two competing LECs and regional Number Portability Administration Centers is required.

Some states have adopted an 800 number type of portability approach as the originating central office (CO) for the telephone call queries a centralized database (Service Control Point—SCP) of telephone numbers via a Signaling System 7 (SS7) link. The SCP identifies the LEC providing telephone service to the target telephone number enabling the originating carrier to hand the call off to the terminating carrier.

Other states, such as Illinois, have adopted an alternative LNP approach where a new 10-digit telephone number known as a Local Routing Number (LRN) is used. When a telephone call is made, the originating CO consults the SCP and is provided with the LRN along with the identification of the CLEC to which the telephone service has been ported. The originating carrier then hands off the call to the CLEC. Although the LRN approach is deemed to be the preferred porting method by telephone industry organizations, this approach requires two telephone numbers which further complicates the administration of the North American Numbering Plan (NANP). Also, both approaches require an extensive signaling network (e.g., SS7) to send out an information query and send back the required data.

Due to the non-uniformity and complexity in performing LNP, the waiting period (for the ILEC to port the number) for the user may be long and inconvenient (e.g., several days). Additionally, oft-times the port is not successfully completed as failed ports may occur that leave the user without viable telephone service due to process and/or technical errors in swinging the telephone lines to the alternative telephone service provider.

Therefore, due to the disadvantages of current LNP approaches, there is a need to provide telephone number porting that is performed quickly and efficiently to ensure seamless quality of telephone service for the user via in switching from a first telephone service provider to a second telephone service provider.

SUMMARY OF THE INVENTION

The method of the present invention overcomes the previously mentioned problems by providing seamless porting of a user telephone number from a first telephone service provider network to a second telephone service provider network. A network interface device is provided that is interconnected to the first telephone service provider network, a second telephone service provider network, and at least one user communications device. The network interface device may be remotely controlled using the second telephone service provider network to transfer the user telephone number from the first network to the second network. Further features of the present invention include providing data communications service to the user, via the network interface device and the second telephone service provider network, before porting has been completed. Additional features include continuing to provide telephone service, via the first telephone service provider network, using the network interface device until porting to the second telephone service provider network has been completed. Advantageously, embodiments of the present invention described herein may be used to efficiently port user voice communications service (e.g., telephone service) from an incumbent local exchange carrier to a competitive local exchange carrier providing fixed wireless communications service.

DETAILED DESCRIPTION

Figure 1:
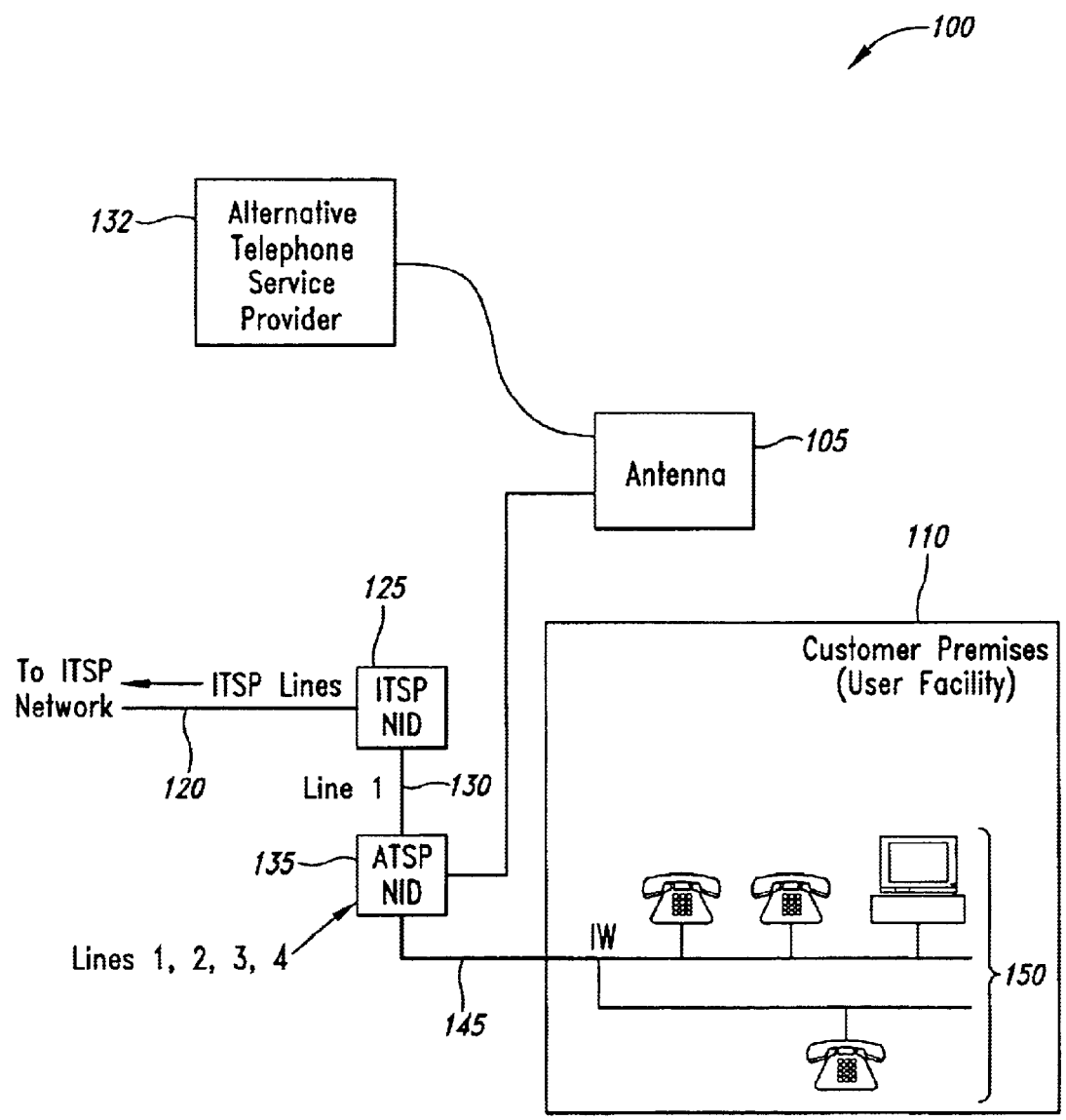
FIG. 1 is a block diagram of an exemplary local porting architecture in accordance with an embodiment of the present invention.

FIG. 1 shows a block diagram of an exemplary local porting architecture 100 in accordance with an embodiment of the present invention. Architecture 100 helps provide seamless, remote porting of a user telephone number from a first telephone provider (carrier) network to a second telephone provider (carrier) network to allow continued voice communications service (e.g., telephone service) over the second telephone provider network. The architecture 100 includes a network interface device 135 interconnected to an antenna 105 located outside a user facility 110. As shown in FIG. 1, network interface device (NID) 135 may be adjacent to (co-located outside) the user facility (customer premises) 110 for ease of installation and wiring. Alternatively, the remote unit NID 135 may include a network communications device portion that is separately located inside the user facility 110 and that interconnects with antenna 105. NID 135 communicates, via antenna 105, with equipment 132 of an alternative (second) telephone service provider network (e.g., a competitive local exchange carrier) to provide a plurality of communications services (e.g., high-speed data, voice, video, etc.) to a user. A power supply (e.g., uninterruptible power supply—UPS) (not shown) may be located inside the user facility 110, interconnected to NID 135, to provide power for voice communications with an alternative telephone service provider network. Advantageously, the alternative telephone service provider may provide these services via a fixed wireless communications network using a digital broadband wireless air interface. It is noted that the terms "connect" and "interconnect" as used herein suggest a direct or indirect connection between system or device elements.

NID 135, which may be provided by the alternative telephone service provider (ATSP), interconnects (e.g., located adjacent to) with an incumbent (first) telephone service provider (ITSP) network interface device 125 (e.g., an ILEC) over link 130. Interface device 125 interconnects with the incumbent network via communications link 120. Additionally, network interface device 135 interconnects with a plurality of user communications devices 150 over link 145. Advantageously, link 145 may be the inside wiring (IW) for the customer premises 110 that interconnects each of the user communications devices 150 and allows the devices 150 to interconnect with external communications networks (e.g., an ILEC). Advantageously, user communications devices 150 may include, but are not limited to, telephones, computers, personal digital assistants (PDAs), fax machines, internet accessible video displays or televisions, or any other user communications device using link 145 for external communications network access.

During operation before actual user telephone number porting is completed, NID 135 acts as a pass-through switch allowing voice communications signals (e.g., telephone signals) to pass through from (or to) the incumbent network, via link 120, incumbent network NID 125, and link 130, to (or from) at least one of the user communications devices 150 via link 145 to provide voice communications services (e.g., telephone service) for the user. Advantageously before the port, the user may make and receive telephone calls, via communications devices 150, using the user's accustomed telephone number over the incumbent telephone service provider network.

Alternatively, after actual user telephone number porting has been completed, NID 135 may act as a switch to allow voice communications signals (e.g., telephone signals), transmitted to or received from user communications devices 150 via link 145, to be carried over the alternative telephone service provider network.

Link 120 incoming from the incumbent telephone service provider network may carry a plurality of communications (e.g., telephone) lines to NID 125, where NID 125 may extract only one communication line (e.g., one line for a single telephone number, line 1) for link 130 when interconnecting to the user facility 110 via NID 135. Advantageously, although incoming link 130 from the incumbent telephone service provider network may support only one communications line (for a single telephone number), NID 135 may support a plurality of communications lines (e.g., at least four; lines 1, 2, 3, 4) to provide multiple telephone service lines for the user over the alternative telephone service provider network.

Figure 2:
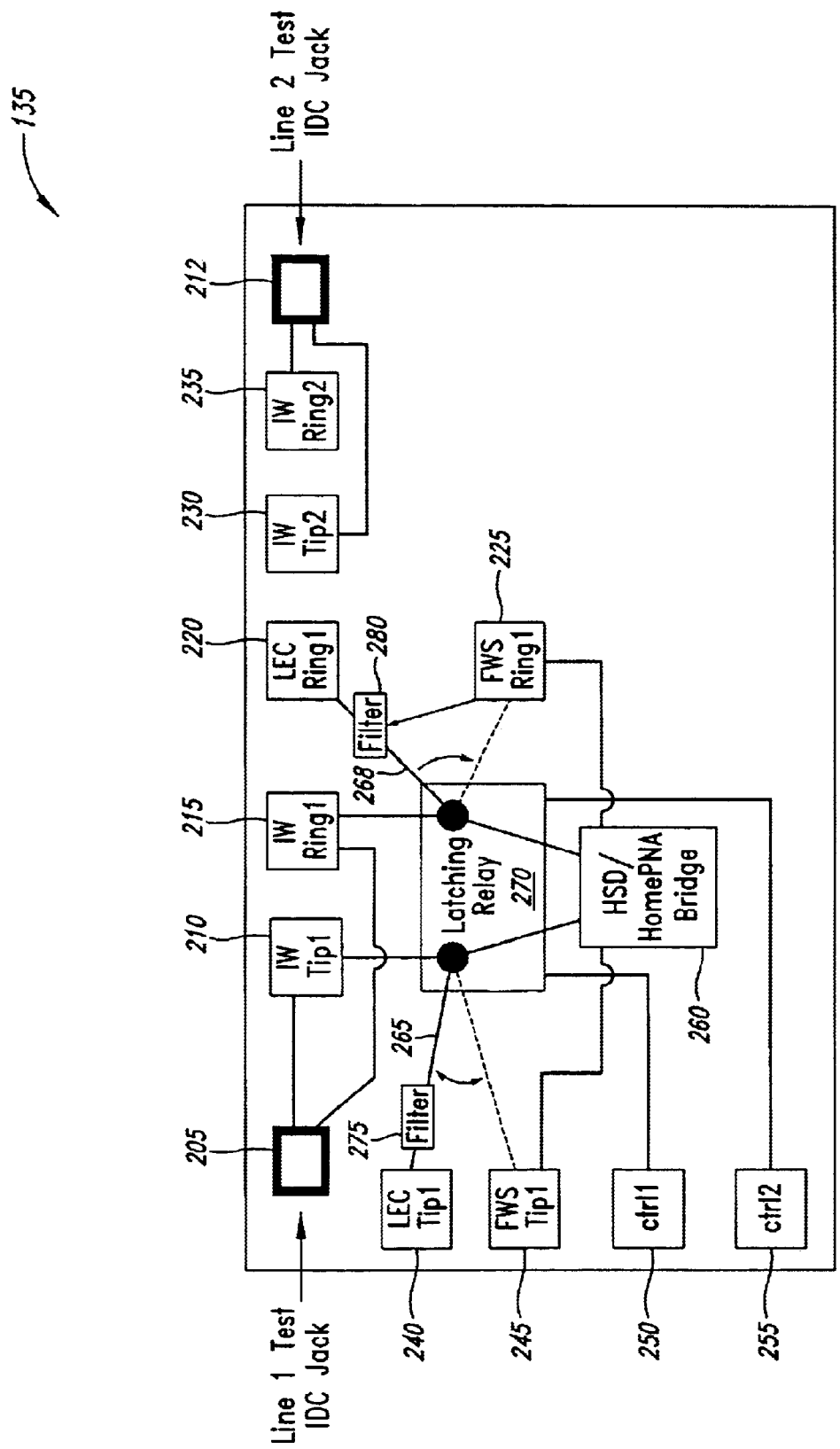
FIG. 2 is a block diagram of an exemplary network interface device in accordance with an embodiment of the present invention.

FIG. 2 shows a block diagram of the exemplary network interface device (NID) 135 in accordance with an embodiment of the present invention. When porting occurs, in reference to FIGS. 1 and 2, NID 135 may be controlled to switch the communications lines (link 130) interconnected with the incumbent telephone service provider network to the communications lines interconnected with the alternative telephone service provider network to provide voice communications service (e.g., telephone service) for the user via the user communications devices 150.

In reference to FIGS. 1 and 2, NID 135 includes relay circuitry 270 interconnected to a high-speed data/ homephone networking alliance (HSD/HomePNA) bridge 260. Relay 270 may be a latching or non-latching relay. A latching relay offers the advantage of lower power consumption. HSD/HomePNA bridge 260 interconnects to the alternative telephone service provider network via tip and ring communications lines 245, 225. HomePNA generally refers to the composite industry group working to ensure adoption of unified phoneline network industry standard, and home networking generally refers to the collection of elements that process, manage, transport, and store information to enable the connection and integration of multiple computing, control, monitoring, and communications devices in the home. Further features of HomePNA may be found in the HomePNA specification 2.0, the disclosure of which is incorporated by reference herein.

Relay 270 interconnects using lines 265, 268, and via filters 275, 280, to the incumbent telephone service provider network via tip and ring communications lines 220, 240. Alternatively, relay 270 may interconnect using lines 265, 268, and via filters 275, 280, to alternative telephone service provider network via tip and ring communications lines 245, 225. Also, relay 270 interconnects to internal wiring (IW) tip and ring communications lines 210, 215 and receives control signals over control lines 250, 255 from the alternative provider network. IW tip/ring lines 210, 215 provide communications signals from the plurality of user communications devices 150. Also, although not shown, NID 135 may include a plurality other elements, including other connectors, relays, bridges, and filters, to provide efficient, seamless porting of a user telephone number from a first telephone service provider network to a second telephone service provider network.

During operation before actual user telephone number porting is completed, relay 270 is interconnected, via lines 265, 268 and filters 275, 280, to the incumbent telephone provider network via tip and ring communications lines 240, 220 allowing voice communications service for the user via IW tip and ring communications lines 210, 215 interconnected to user communications devices 150. Additionally, although the user is provided telephone service from the incumbent provider during this arrangement, the HSD/HomePNA bridge 260 may still provide high-speed data communications service for the user (from one of communications devices 150) by interconnecting to the alternative provider network via communication lines 245, 225. The user, from one of the user communications devices 150 (e.g., a computer), is interconnected to the bridge 260 via IW tip and ring communications lines 210, 215 and relay 270. Filters 275, 280 help reduce any signal interference entering the bridge 260, via lines 265, 268, from the incumbent telephone network. The filters 275, 280 help prevent any substantial degradation of the high-speed data communications signal being transported from one of the user communications devices 150 to the alternative provider network via IW tip/ring lines 210, 215, relay 270, and bridge 260.

During operation to complete actual user telephone number porting, relay 270 receives control signals from the alternative provider network, via control signal lines 250, 255, to switch lines 265, 268 from interconnecting to incumbent provider tip/ring lines 240, 220 to interconnecting to alternative provider tip/ring lines 245, 255. After the switch is completed, voice communications services may be provided for the user communications devices 150 (for the user) using the alternative service provider via IW tip/ring lines 210, 215, relay 270, and alternative tip/ring 245, 255.

Advantageously using architecture 100, in accordance with embodiments of the present invention, NID 135 is completely installed, tested, and verified prior to initiating the porting of the user telephone number. For this feature, NID 135 includes test jacks 205, 212 to test multiple tip/ring communications lines 210, 215 and 230, 235 ensuring that voice communications services (e.g., check of dial-tone) may be provided for the user (from user communications devices 150) from the incumbent provider (before porting) or from the alternative provider (after porting). Testing of tip/ring lines 210, 215 (e.g., line 1 from the incumbent provider) using test jack 205 ensures that voice communications service may be provided over these lines, via NID 135, from the incumbent provider before porting is completed or from the alternative provider after porting is completed. Alternatively, testing of tip/ring lines 230, 235 (e.g., lines 2, 3, 4, etc. from the alternative provider) using test jack 212 ensures that voice communications service may be provided over a plurality of additional lines from the alternative provider before porting is completed (if the plurality of additional lines support phone numbers not ported from the incumbent provider) or after porting is completed (if these additional lines support phone numbers ported from the incumbent provider).

Figure 3:
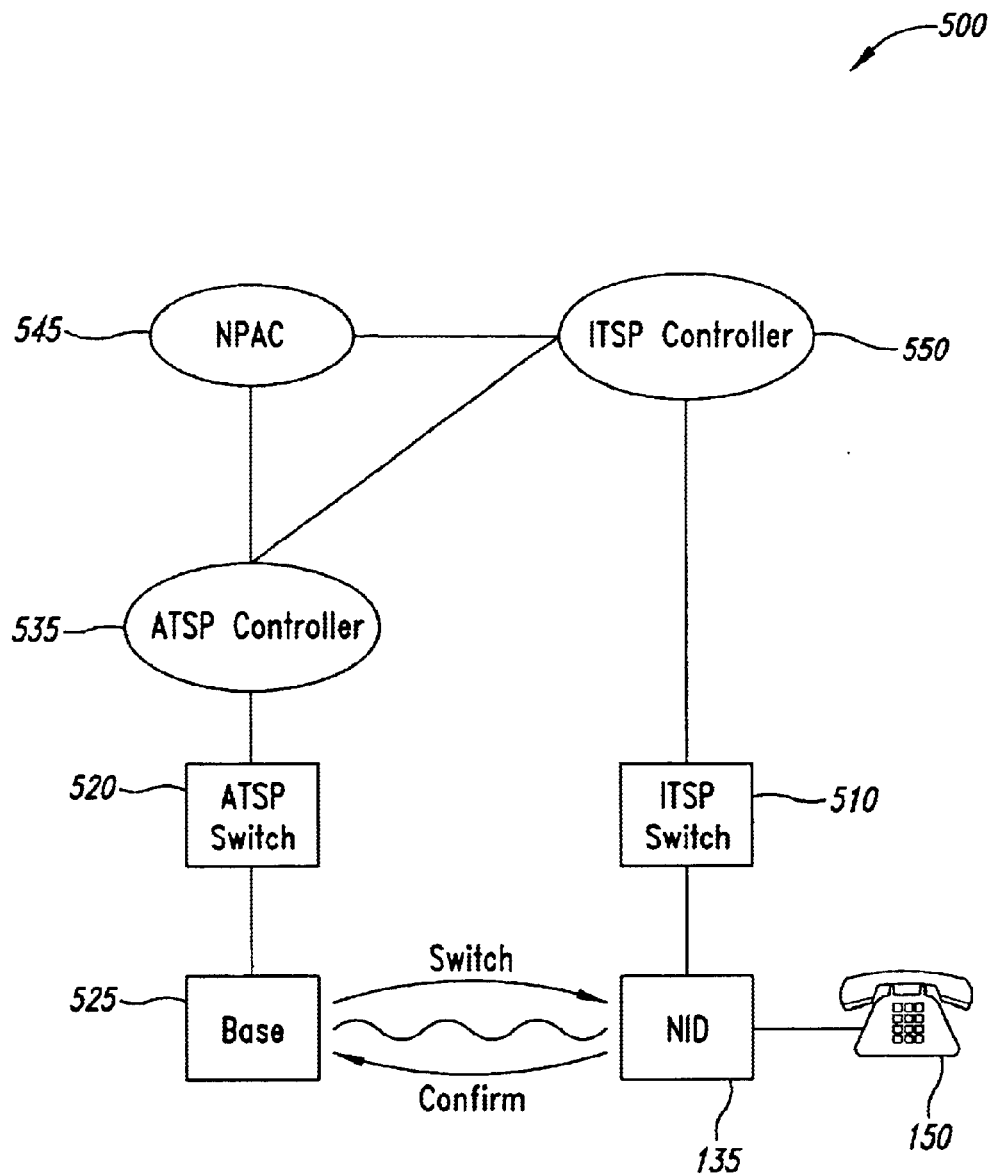
FIG. 3 is a block diagram of an exemplary remote porting system architecture in accordance with an embodiment of the present invention.

FIG. 3 shows a block diagram of an exemplary remote porting system architecture 500 in accordance with an embodiment of the present invention. System architecture 500 includes alternative service provider switch 520 (e.g., 5ESS), alternative service provider controller 535, incumbent provider switch 510 (e.g., 5ESS), incumbent service provider network controller 550, Number Portability Administration Center 545 (NPAC), base station 525, NID 135, and user communications devices 150. Advantageously, base station 525 may be interconnected to NID 135 using a wireless link.

After the user has selected (e.g., purchased or agreed to purchase service from) the alternative service provider, the alternative telephone service provider switch 520 (e.g., 5ESS) is provisioned to provide voice communications service to the user. This pre-provisioning (before actual user telephone number porting) of the switch 520 allows NID 135 to be tested for dial-tone during installation procedures.

During operation for user communications (e.g., provision of fixed wireless local loop services), base station 525 engages in radio communications with NID 135 to help establish a communications path between the user and interconnecting communications networks (e.g., land-line phone network). ATSP controller 535 controls the switching functions of ATSP switch 520 to help connect users across networks for various communications services (e.g., local, long-distance calls, internet usage, etc.). ITSP controller 550 performs similar functions to control the functions of ITSP switch 510.

Advantageously, NPAC 545 is a regional administration center that assists with the porting process. During porting operation, NPAC 545 interacts with both the ATSP network and ITSP network via controllers 535, 550 to help effect the transfer of the user's telephone number from the incumbent provider to the alternative provider. Advantageously, controllers 535, 550 may function as, or connect to, operations support systems (OSSs) and/or local service order administrations (LSOAs) to help perform the porting process. LSOAs are used by carriers (telephone service providers) to administer service orders including, but not limited to, orders for new service, service rearrangements, and changes of carrier. OSSs are methods and procedures to support the daily operation of the provider network. The provider (carrier) network may include a plurality of OSSs including, but not limited to, automated systems supporting order negotiation, order processing, line assignment, line testing, and billing.

NPAC 545 functions to synchronize the numbering databases, and to coordinate the porting process. When a user selects (e.g., places an order) to change the serving provider, ATSP controller 535 communicates that request to the NPAC 545, advantageously via an ATSP OSS and ATSP LSOA. NPAC 545 notifies controller 550 of the request, advantageously via an ITSP LSOA. After the porting is completed, NPAC 545 communicates all relevant data (e.g., information relating to the change in telephone service provider) to all provider (carrier) LSOAs in its region and the provider LSOAs forward the data to regional local service management systems (LSMSs). The regional LSMSs communicate the data to the ITSP and ATSP LSOAs, and the LSOAs pass on the information to the OSSs for both providers to assist in providing telephone service for the user after porting.

Figure 4:
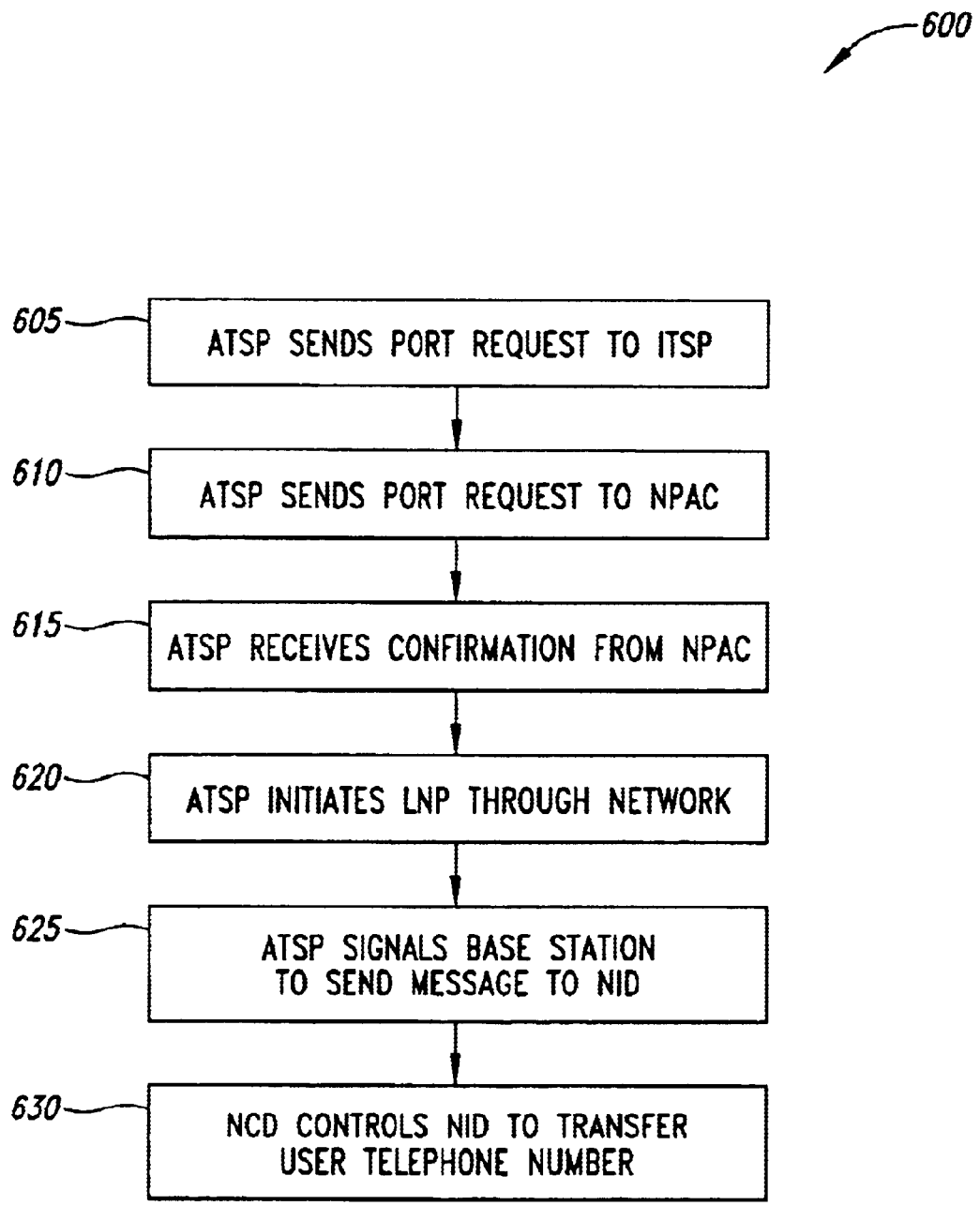
FIG. 4 shows a flow process diagram to initiate and complete a remote porting of a user telephone.

In accordance with embodiments of the present invention, FIG. 4 shows an exemplary flow process diagram 600 (followed by system architecture 500) for initiating and completing a remote port of a user telephone number from the incumbent telephone service provider network to the alternative telephone service provider network. Advantageously, the remote port described herein may be performed using software programs executed at the relevant system elements of system architecture 500. At step 605, the alternative provider, via controller 535, sends a request (e.g., local service request) to incumbent provider network controller 550 to port the user telephone number from the incumbent provider network controller 550 to the alternative provider network.

At step 610, after receiving confirmation from the incumbent network controller 550, the alternative provider network controller 535 sends a request to the NPAC 545 to port the user telephone number using the porting information contained in NPAC databases, and receives confirmation. Incumbent controller 550 sends a concurring request to NPAC to port the user telephone number.

At step 615, alternative controller 535 receives confirmation from NPAC 545 of notification of the port being sent from NPAC 545 to incumbent controller 550. At step 620, the local number portability (LNP) is initiated throughout the alternative service provider network to ensure voice communications service for the user via the alternative network. This process is culminated at steps 625, 630 where at step 625 the base station 525 is signaled, via switch 520, to send a command message to NID 135. At step 630, in response to the received message, NID 135 is controlled (commanded) to transfer the user telephone number by switching the communication lines. 265, 268 as previously described herein, using relay 270, from the incumbent telephone service provider network which produces dial-tone for the user over the alternative provider network which produces dial-tone for the user over the alternative provider network equipment. Following the completion of step 630, user communications devices 150 may used for voice communications over alternative service provider network as IW tip/ring lines 210, 215 (interconnected to user communications devices 150) have been switched over to the alternative service provider network and the incumbent communications lines 240, 220 have been disconnected. It is noted that fixed wireless subscriber loop services are known in the art for delivering an equivalent of wired services over a wireless link to a user via an antenna communications link. Also, further command messages (e.g., confirmations, etc.) may be sent between the various elements of the porting system architecture 500 to help provide a more efficient system for porting the user telephone number from the incumbent provider network to the alternative provider network.

Advantageously, in accordance with embodiments of the present invention, the method disclosed herein enables the initiation and completion of a remote, software port of a user telephone number from a first telephone service provider network to a second telephone service provider network.

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

What is claimed is:

1. A method for porting a telephone number, comprising:
   connecting a network interface device to a first telephone service provider network, a second telephone service provider network, and to at least one user communications device;
   remotely controlling said network interface device, via the second telephone service provider network, to transfer a user telephone number, previously used for voice communications via the first telephone service provider network, from the first telephone service provider network to the second telephone service provider network;
   wherein said step of remotely controlling includes remotely controlling said network interface device to switch from communications lines interconnected with the first telephone service provider network to communications lines interconnected with the second telephone service provider network to-provide voice communications service for the user via the user communications device; and
   wherein the remote controlling is performed via a control signal independent of the switched communication lines.

2. The method of claim 1, wherein the first telephone service provider is an incumbent local exchange service provider and the second telephone service provider is a competitive local exchange service provider that provides fixed wireless communications services to the user.

3. A method for porting a telephone number, comprising:
   connecting a network interface device to a first telephone service provider network, a second telephone service provider network, and to at least one user communications device;
   remotely controlling said network interface device, via the second telephone service provider network, to transfer a user telephone number, previously used for voice communications via the first telephone service provider network, from the first telephone service provider network to the second telephone service provider network;
   wherein said step of remotely controlling includes remotely controlling said network interface device to switch from communications lines interconnected with the first telephone service provider network to communications lines interconnected with the second telephone service provider network to provide voice communications service for the user via the user communications device; and
   wherein said network interface device includes a remote unit, and wherein the remote unit is interconnected to an antenna for providing a fixed wireless communications path to the competitive local exchange service provider network.

4. A method for porting a telephone number, comprising connecting a network interface device to a first telephone service provider network, a second telephone service provider network, and to at least one user communications device;
   remotely controlling said network interface device, via the second telephone service provider network, to transfer a user telephone number, previously used for voice communications via the first telephone service provider network, from the first telephone service provider network to the second telephone service provider network;
   wherein said step of remotely controlling includes remotely controlling said network interface device to switch from communications lines interconnected with the first telephone service provider network to communications lines interconnected with the second telephone service provider network to-provide voice communications service for the user via the user communications device; and
   wherein said at least one of the first and second telephone service providers uses a digital broadband wireless air interface.

5. The method of claim 1, wherein said network interface device is interconnected to the user communications device via inside wiring of a user facility.

6. The method of claim 1, wherein said network interface device is interconnected to the communications device via a plurality of communications lines allowing transfer of a plurality of user telephone numbers from the first network to the second network, and for providing voice communications service to the user via the second network before the transferring of the user telephone number has been completed.

7. The method of claim 1, wherein said circuitry includes home phone network alliance circuitry to allow said communications service.

8. The method of claim 1, wherein said step of remotely controlling reduces the time period for the transfer of the user telephone number from the time period required using the first telephone network for controlling the transfer of the user telephone number.

9. The method of claim 1, wherein the network interface device includes a network communications device for communicating with the second telephone service provider network, and wherein the network communications device portion is located inside of a user facility and the remaining portion of the network interface device is substantially located outside of the a user facility.

10. The method of claim 1, wherein said network interface device includes circuitry for performing the transfer of the user telephone number, reducing interference from the first telephone service provider network to allow data communications service for the user via the second telephone service provider network, and for providing voice communications service via the first telephone service provider network until the user telephone number is transferred to the second telephone service provider network.

11. A method for porting a telephone number, comprising:
    receiving control signals, remotely transmitted from a second telephone service provider network, to transfer a user telephone number, previously used for voice communications via the first telephone service provider network, from a first telephone service provider network to the second telephone service provider network; and
    switching, in response to the received control signals, communications lines interconnected with the first telephone service provider network to communications lines interconnected with the second telephone service provider network to provide voice communications service for the user via the user communications device, wherein the remote controlling is performed via a control signal independent of the switched communication lines.

12. The method of claim 11, further comprising:

providing data communications service for the user via the second telephone service provider network by reducing interference from the first telephone service provider network; and providing voice communications service via the first telephone service provider network until the user telephone number is transferred to the second telephone service provider network.

13. An apparatus for porting a telephone number, comprising:

a network interface device interconnected to a first telephone service provider network, a second telephone service provider network, and to at least one user communications device;

wherein said network interface devices includes circuitry for receiving control signals, remotely transmitted from the second telephone service provider network, for transferring a user telephone number, previously used for voice communications via the first telephone service provider network, from the first telephone service provider network to the second telephone service provider network; and wherein said network interface device includes circuitry for switching communications lines interconnected with the first telephone service provider network to communications lines interconnected with the second telephone service provider network to provide voice communications service for the user via the user communications device, wherein the remote controlling is performed via a control signal independent of the switched communication lines.

14. The apparatus of claim 13, wherein said network interface device includes circuitry for performing the transfer of the user telephone number, reducing interference from the first telephone service provider network to allow data communications service for the user via the second telephone service provider network, and for providing voice communications service via the first telephone service provider network until the user telephone number is transferred to the second telephone service provider network.

15. A system for porting a telephone number, comprising:

a second telephone service provider network that provides telephone service to a plurality of users as an alternative to a first telephone service provider network;

a network interface device interconnected to the first telephone service provider network, the second telephone service provider network, and to at least one user communications device;

wherein said network interface devices includes circuitry for receiving control signals, remotely transmitted from the second telephone service provider network, for transferring a user telephone number, previously used for voice communications via the first telephone service provider network, from the first telephone service provider network to the second telephone service provider network; and wherein said network interface device includes circuitry for switching communications lines interconnected with the first telephone service provider network to communications lines interconnected with the second telephone provider network based on the control signals, the control signals being transmitted independently of the switched communication lines, and for providing voice communications service via the first telephone service provider network until the user telephone number is transferred to the second telephone service provider network.

16. The system of claim 15, wherein said network interface device includes circuitry for performing the transfer of the user telephone number, reducing interference from the first telephone service provider network to allow data communications service for the user via the second telephone service provider network, and for providing voice communications service via the first telephone service provider network until the user telephone number is transferred to the second telephone service provider network.

17. A method for porting a user telephone number, comprising:

providing telephone service to a plurality of users as an alternative telephone service provider network to a first telephone service provider network;

connecting a network interface device to the first telephone service provider network, the alternative network, and to at least one user communications device;

remotely transmitting control signals to the network interface device for transferring a user telephone number, previously used for voice communications via the first telephone service provider network, from the first telephone service provider network to the alternative provider network; and wherein said step of remotely transmitting includes remotely transmitting control signals to switch communications lines interconnected with the first telephone service provider network to communications lines interconnected with the alternative provider network, the control signals being transmitted independently of the switched communication lines, and to provide voice communications service via the first telephone service provider network until the user telephone number is transferred to the alternative telephone service provider network.

18. An apparatus for porting a telephone number of a user communications device coupled to a first service provider to a second service provider, comprising:

a first communication link coupled to the first service provider;

a second communication link coupled to the second service provider; and a network interface device coupled to the first telephone service provider via the first communication link, coupled to the second telephone service provider via the second communication link, and coupled to the user communications device;

a control line coupled between the network interface device and the second service provider; and circuitry within the network interface device configured to receive a control signal from the second telephone service provider via the control line, the circuitry responsive to the received control signal to switch the user communications device from the first communication link to the second communication link whereby voice communications service for the user via the user communications device is changed from the first service provider to the second service provider.

19. The apparatus of claim 18 wherein the second communication link.

* * * * *